United States Patent [19]

Choi

[11] Patent Number: 5,267,101
[45] Date of Patent: Nov. 30, 1993

[54] TAPE TRACKING CONTROL APPARATUS

[75] Inventor: Hang J. Choi, Seoul, Rep. of Korea

[73] Assignee: Gold Star Co., Ltd., Seoul, Rep. of Korea

[21] Appl. No.: 699,170

[22] Filed: May 13, 1991

[30] Foreign Application Priority Data

May 22, 1990 [KR] Rep. of Korea ............... 7362/1990

[51] Int. Cl.5 .................................. G11B 21/04
[52] U.S. Cl. ........................................ 360/70
[58] Field of Search ............................. 360/70

[56] References Cited

U.S. PATENT DOCUMENTS

| | | | |
|---|---|---|---|
| 4,139,871 | 2/1979 | Yoshida et al. | 360/70 |
| 4,393,417 | 7/1983 | Kobayashi et al. | 360/70 |
| 4,521,815 | 6/1985 | Tokuyama | 360/70 |
| 4,573,619 | 3/1986 | Grant | 360/70 |
| 4,945,426 | 7/1990 | Okamoto et al. | 360/70 |

*Primary Examiner*—William L. Sikes
*Assistant Examiner*—Toan Tran
*Attorney, Agent, or Firm*—Fish & Richardson

[57] ABSTRACT

An apparatus for controlling a tracking of a tape for a 8 mm VCR or a DAT in a helical scanning tracking system in which the tape is wound around a rotating drum and transported by a capstan shaft and a pinch roller, both of which are operated at its downstrean portion, the apparatus comprising actuating means provided in the traveling path of the tape for varying a traveling condition of the tape, thereby carrying out a stable and fast tracking control for aligning a recorded track of the tape with a head of the rotating drum by changes of eccentricity in response to voltage variation.

1 Claim, 3 Drawing Sheets

TAPE TRACKING CONTROL APPARATUS

BACKGROUND OF THE INVENTION

1. Field of the Invention

The present invention relates to an apparatus for controlling a tracking of a tape for a 8 mm VCR (Video Cassette Recorder) or a DAT (Digital Audio Tape) to align a recorded signal track of the tape with a head of a rotating drum of the VCR or the like.

2. Description of the Prior Art

A tracking apparatus of the prior art is of a type as shown in FIGS. 1 and 2, in which a tape(2) is brought into contact with a rotating drum(3) by means of tape traveling guide rollers(1a,1b) and traveling of the tape(2) is effected by means of a capstan shaft(4) and a pinch roller(5), both of which are operated at its downstream portion. Such a prior apparatus carries out a first mode of a recording operation in which signals are recorded on the tape, and a second mode of a playback operation in which a head of the rotating drum follows a recorded track of the tape.

In the playback operation mode, there may be occurred depending upon a traveling condition of the tape a state in which the track(11) of the tape(2) precedes the head(10) of the rotating drum, as shown in FIG. 6a, or another state in which the track(11) lags behind the head (10), as shown in FIG. 6c. In this manner, when the head(10) and track(11) are not aligned with each other, as in the states shown in FIGS. 6a and 6c, in contrast to that shown in FIG. 6b, in which the two are in registrer, a picture noise or a picture trembling phenomenon is generated. Therefore, in this case, a tracking control of the prior art for aligning the track(11) of the tape with the head(10) of the rotating drum, as shown in FIG. 6b, is carried out by, when the track(11) precedes the head(10), as shown in FIG. 6a, reducing a rotational speed of the capstan shaft which functions to transport the tape, and when the track(11) lags behind the head(10), as shown in FIG. 6c, increasing the rotational speed of the capstan shaft. On the other hand, in the record operation mode, the capstan shaft(4) is interlocked to the rotating drum(3) through a phase servo mechanism to transport the tape in synchronism with the rotation of the drum. In the playback and recording modes, the rotating drum(3) always rotates at a constant speed.

In the prior apparatus in which an alignment of the track of the tape with the head of the rotating drum is accomplished by controlling the rotational speed of the capstan shaft as discussed above, a motor for driving the capstan shaft must have an excellent control characteristic. The control characteristic, however, highly depends upon a rotational speed of the motor, so that controllability of the motor becomes deteriorated in a low speed mode. Further, the control action is slow due to high inertia of the capstan shaft itself connected to the motor.

SUMMARY OF THE INVENTION

In view of the aforesaid drawbacks of the prior art apparatus it is an object of the present invention to provide an apparatus of easily effecting a tracking control of a tape for a video cassette recorder (VCR) or a digital audio tape(DAT) to align a head of a rotating drum with a track of the tape, without depending upon a control of a rotational speed of a capstan shaft.

To achieve the above object, there is provided according to a first form of the present invention an apparatus for controlling a tracking of a tape for a VCR or a DAT in a helical scanning tracking system in which the tape is wound around a rotating drum and transported by means of a capstan shaft and a pinch roller, both of which are operated at its downstream portion, the apparatus comprising actuating means provided in the traveling path of the tape for varying a traveling condition of the tape.

According to a second form of the present invention, there is provided an apparatus for controlling a tracking of a tape according to the first form of the present invention, wherein the actuating means comprises a variable member for changing a length of the tape traveling path in response to a condition of the track of the tape relative to a head of the rotating drum, and a variation adjusting member for rotating the variable member in right and left directions to adjust a variation of the length of the tape traveling path.

According to a third form of the present invention, there is provided an apparatus for controlling a tracking of a tape according to the second form of the present invention, wherein the variable member comprises an eccentric bushing, and the variation adjusting member comprises a rotor disposed integrally with the eccentric bushing to rotate a rotary shaft, and a stator arranged in constantly spaced confronting relation to the rotor so as to rotate the rotor.

BRIEF DESCRIPTION OF THE INVENTION

The invention will be more fully understood from the following detailed description thereof, taken in connection with the accompanying drawings which form a part of this application and in which.

Figure 5A:
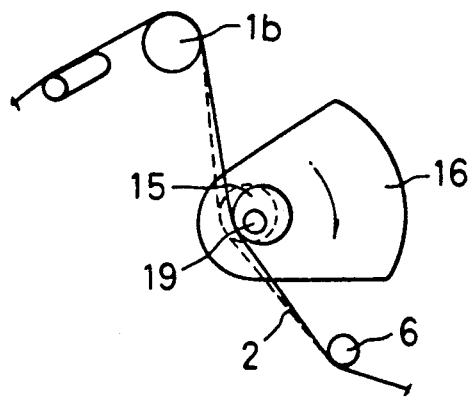
Figure 6A:
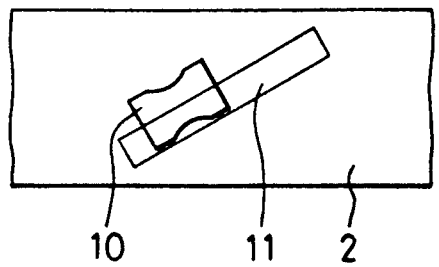
Figure 5B:
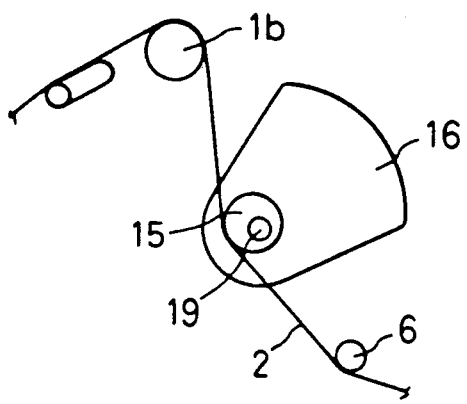
Figure 6B:
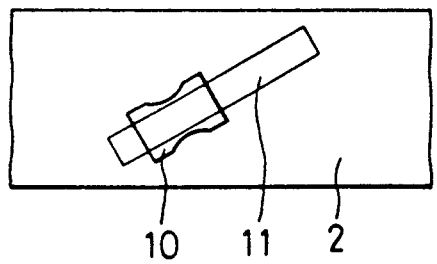
Figure 5C:
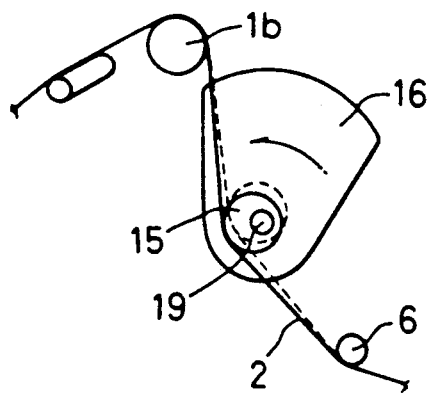
Figure 6C:
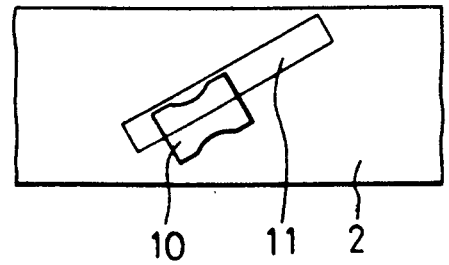

FIGS. 5a, 5b, 5c are views for explaining the operation of the present invention; and FIGS. 6a-6c views diagrammatically illustrating different contact conditions of a rotating drum, wherein 6a shows a condition in which the track precedes the head, 6b shows another condition in which the track is registered with the head, and 6c shows still another condition in which the track lags behind the head.

DESCRIPTION OF THE PREFERRED EMBODIMENT

Figure 1:
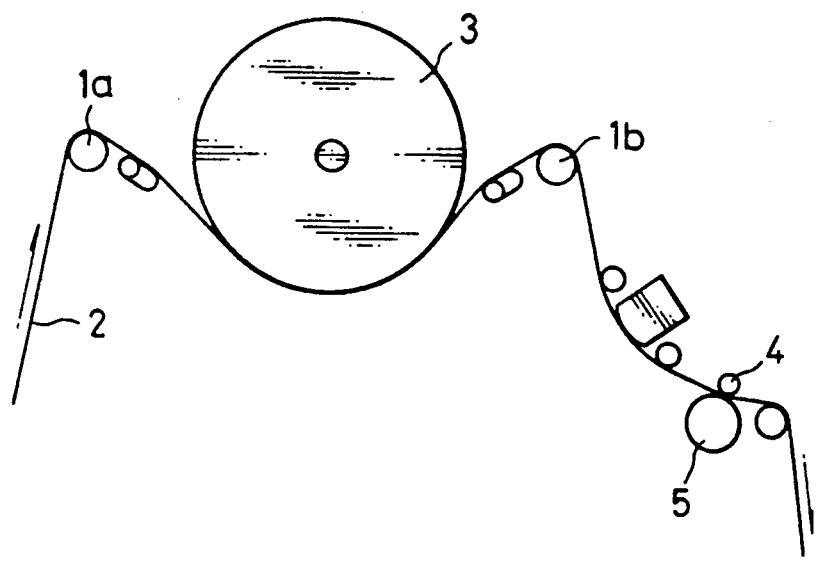
FIG. 1 is a diagrammatic plan view of a tape transport system according to the prior art.
Figure 2:
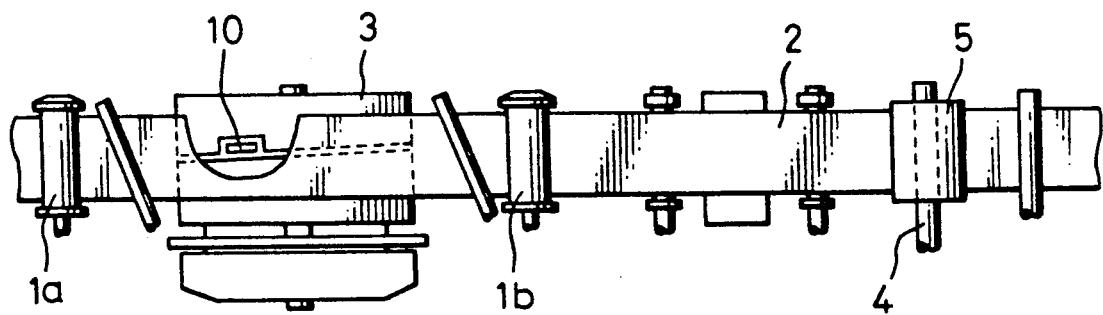
FIG. 2 is a side elevational view of the system shown in FIG. 1.
Figure 3:
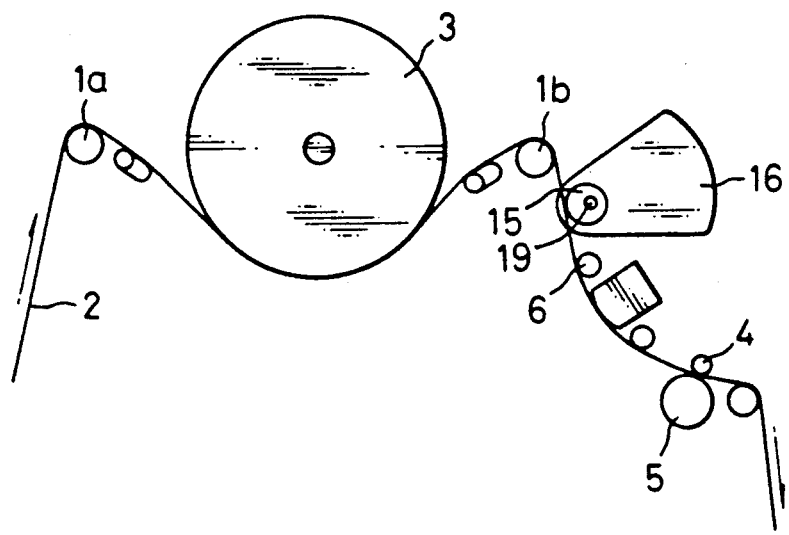
FIG. 3 is a diagrammatic plan view of a tape transport system incorporating the present invention.

Referring first to FIG. 3 which is a diagrammatic plan view of a tape transport system incorporating the present invention, a tape(2) is brought into contact with a rotating drum(3) by means of tape traveling guide rollers (1a, 1b) and transported by means of a capstan shaft(4) and a pinch roller(5), both of which are operated at its downstream portion. Such a basic construction is same as the prior art. According to the present invention, actuating means is arranged between one of the tape traveling guide rollers(1b) and still another guide roller(6) to effect a tracking control of the tape(2) by varying a traveling condition of the tape.

Figure 4:
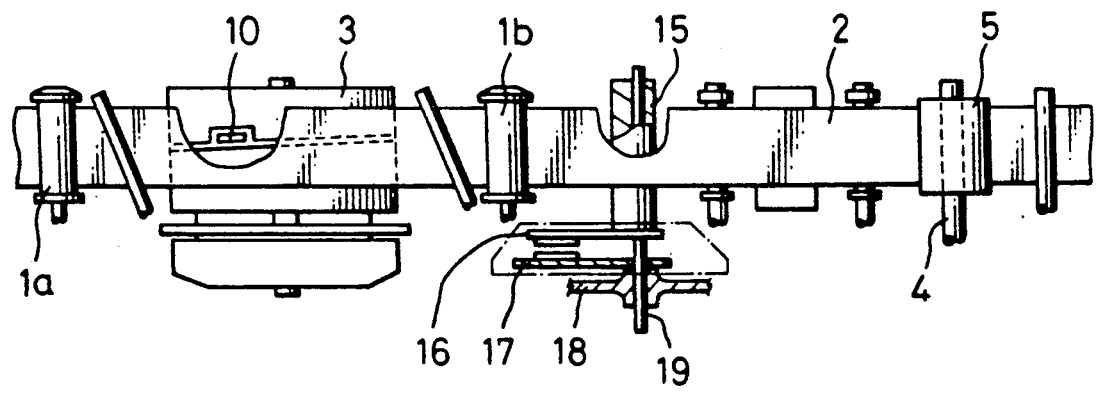
FIG. 4 is a side elevational view of the system shown in FIG. 3.

As shown in FIG. 4, the actuating means comprises a variable member, i.e., an eccentric bushing(15) for changing a length of the tape traveling path in response to a sensed condition of a track(11) of the tape(2) relative to a head(10) of the rotating drum(3), and a variation adjusting member for rotating the variable member, i.e., the eccentric bushing(15) in right and left directions to adjust a variation of the length of the tape traveling path. The variation adjusting member comprises a rotor(16) and a stator(17), both of which are disposed in constantly spaced confronting relation to each other. The rotor(16) may be rotated about a rotary shaft(19), which is rotatably mounted on a chassis or frame(18), by an angle corresponding to voltage applied to the stator(17). When the rotor(16) integrally connected to the eccentric bushing(15) is rotated about the rotary shaft(19), the eccentric bushing(15) being in contact with the tape is also rotated together with the rotor, thereby varying the length of the tape traveling path according to eccentricity of the eccentric bushing. In this manner, since the tape(2) is gripped at its downstream portion by the capstan shaft(4) and the pinch roller(5), both of which cooperate with each other to transport the tape, the eccentric bushing changes the length of the tape traveling path extending from a point at which the tape(2) departs from the rotating drum(3), to the capstan shaft(4), thus aligning the recorded track of the tape(2) with the head (10) of the rotating drum(3).

The operation of aligning the track of the tape with the head of the rotating drum by such an eccentricity adjustment will be described in more detail with reference to FIGS. 5 and 6. When the track(11) of the tape(2) precedes the head(10), as shown in FIG. 6a, the rotor (16) is rotated clockwise, as shown in FIG. 5a, thus rotating the eccentric bushing(15) clockwise, whereby the tape traveling path indicated by the dotted line is shortened as indicated by the solid line. As a result, the track(11) of the tape(2) is shifted to a central position of the head(10) and then maintains its normal condition as shown in FIG. 6b. On the contrary, in the event that the track(11) of the tape lags behind the head(10), as shown in FIG. 6c, the rotor(16) is rotated counterclockwise, as shown in FIG. 5c, and thus the eccentric bushing(15) is also rotated counterclockwise, so that its eccentricity is increased, thereby increasing the tape traveling path indicated by the dotted line to that as indicated by the solid line. As a result, the track(11) of the tape(2) is shifted to the central position of the head(10) and then maintains its normal condition as shown in FIG. 6b. The position shown in FIG. 5b is the normally operative condition in which the track(11) of the tape is aligned with the head (10), as shown in FIG. 6b. On the other hand, in a record operation mode, after the track(11) of the tape(2) has been adjusted to be maintained at the central position of the head(10) as discussed above, the capstan shaft(4) is interlocked to the rotating drum(3) through a phase servo mechanism (not shown) to transport the tape in synchronism with the rotation of the rotating drum.

As described above, the present invention provides an efficient apparatus for carrying out a precise tracking control of a tape for a VCR or a DAT by varying eccentricity of an eccentric bushing in response to voltage variation, without depending upon an adjustment of a rotational speed of a capstan shaft requiring for a precise control. This apparatus is therefore advantageous in that a stable tracking control may be achieved even in a low speed mode regardless of a characteristic of a capstan motor, resulting in lower manufacturing cost and superior controllability. Another advantage of this apparatus is that a control action is fast due to low inertia of the tracking mechanism.

While the invention has been shown and described with reference to a preferred embodiment thereof, it will be understood that variations and modifications in form and detail may be made therein without departing from the spirit and scope of the invention as defined in the appended claims.

What is claimed is:

1. An apparatus for controlling a tracking of a tape for a VCR or a DAT in a helical scanning tracking system in which the tape is wound around a rotating drum and transported by means of a capstan shaft and a pinch roller, both of which are operated at the downstream portion of the system, wherein the apparatus comprises a variable member for changing a length of the tape traveling path in response to a condition of the track of the tape relative to a head of the rotating drum, and a variation adjusting member for rotating said variable member in right and left directions to adjust a variation of the length of the tape traveling path, and wherein said variable member comprises an eccentric bushing, and said variation adjusting member comprises a rotary shaft, a rotor disposed integrally with said eccentric bushing such that both rotate about the rotary shaft, and a stator arranged in constantly spaced confronting relation to said rotor so as to rotate said rotor.

* * * * *